(No Model.)
R. REACH.
SPRING BOARD.
No. 436,462. Patented Sept. 16, 1890.
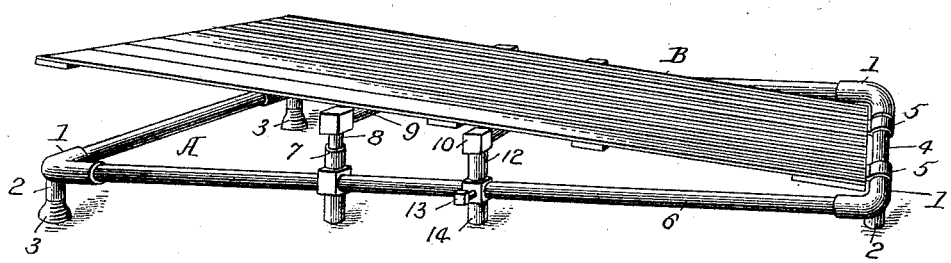
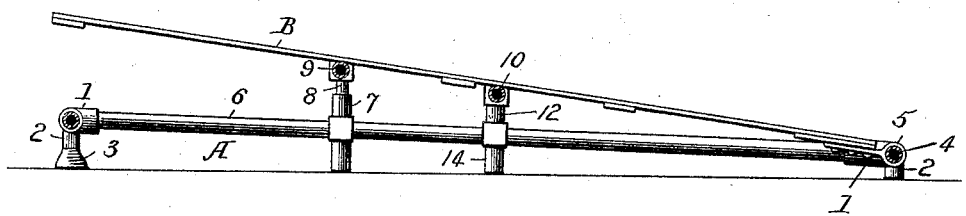
WITNESSES
Jno G. Hinkel.
H. S. McArthur
INVENTOR
Robert Reach.
By Foster & Freeman
Attorneys

UNITED STATES PATENT OFFICE.

ROBERT REACH, OF PHILADELPHIA, PENNSYLVANIA, ASSIGNOR TO THE AMERICAN PATENTS COMPANY, OF SAME PLACE.

SPRING-BOARD.

SPECIFICATION forming part of Letters Patent No. 436,462, dated September 16, 1890.

Application filed June 25, 1890. Serial No. 356,675. (No model.)

*To all whom it may concern:*

Be it known that I, ROBERT REACH, a citizen of the United States, residing in the city and county of Philadelphia, and State of Pennsylvania, have invented certain new and useful Improvements in Spring-Boards, of which the following is a specification.

My invention relates to what are known as "batteau," or "spring-boards;" and it consists in certain improvements whereby to secure a structure incapable of being dismembered except by a fracture, and one which can be readily adjusted so as to vary the spring resistance.

In the accompanying drawings, Figure 1 is a perspective view of my improved spring-board. Fig. 2 is a longitudinal section.

The frame A of the apparatus is of metal, preferably in the form of pipes connected by couplings 1, constituting the corners, each coupling having a neck 2, extending downward and constituting a foot, a knob 3 being secured to each of the rear feet so as to elevate the frame slightly at that end.

The spring-board B, of any suitable construction, is connected to the forward cross-bar 4 in any suitable manner—as, for instance, by metallic straps encircling the bar and fastened to the board, which can thus be swung to different angles to the frame. To each side bar 6 of the frame is connected a guide-bar 7, consisting of a hollow block through which the side bar passes, and a tubular extension receiving a pendent rod 8 from a cross-bar 9, secured to the spring-board or extending beneath the same.

The bearing for the spring-board is a bar 10, extending transversely across the frame above the latter and capable of being adjusted to any required distance from the hinged end of the board. The bar 10 may be supported in any suitable manner to secure said adjustment; but as shown it is supported by two brackets 12, through each of which passes one of the side bars 6, so that the said bracket may be moved along said bar to any desired position, and from the bottom of the bracket extends a foot 14, which bears upon the floor, so as to secure a firm support for the bar. A set-screw 13 serves to secure each bracket in any position to which it is adjusted.

By altering the position of the bar 10 any required strength of spring-support may be secured, so as to adapt the apparatus to the person using it or the particular operations required. By sliding the spring-bar forward the spring can be made stiff and comparatively unyielding, while by sliding it backward it may be rendered light and flexible. The feet may be tipped with rubber to prevent noise.

It will be seen that as above constructed I secure a continuous frame without joints, so that whatever may be the strain put upon the structure it is not possible for the parts to become separated except by absolute fracture. Inasmuch as the board swings upon its supporting-bar 4, there is no tendency to split or strain the parts or pull out the fastenings, as would be the case if the board were rigidly secured to the cross-bar, as heretofore. The guides prevent any lateral slipping of the spring-board should the operator fail to spring upon it in the right position.

Without limiting myself to the precise construction and arrangement of parts shown, I claim—

1. A spring-board for gymnasiums, consisting of a continuous frame A, having feet supporting the frame at an incline, and a board B, connected at one end to the lowest end bar of said frame and having a bearing between its ends, substantially as set forth.

2. The combination of a frame, spring-board jointed to one of the end cross-bars, and an intermediate adjustable bearing, substantially as described.

3. The combination of the frame, spring-board connected at one end of said frame, and cross-bar supported by brackets adjustable upon the side bars of the frame, substantially as set forth.

4. The combination of the frame, spring-board, cross-bar, and brackets provided with feet 14, for the purpose specified.

5. The combination of the frame, spring-board connected at one end of the frame, and cross-bar and side-guides for the board, substantially as set forth.

6. The combination of the frame, spring-board B, cross-bar 10, and guides consisting of a cross-bar 9, with pendent rods 8, sliding in sockets in guide-pieces 7, substantially as set forth.

In testimony whereof I have signed my name to this specification in the presence of two subscribing witnesses.

ROBERT REACH.

Witnesses:
A. W. KIDDLE,
WM. A. REDDING.